No. 689,541. Patented Dec. 24, 1901.
T. CUNNINGHAM.
CONDUIT FOR ELECTRIC WIRES OR CABLES.
(Application filed Dec. 26, 1899.)
(No Model.)

WITNESSES
INVENTOR

THE NORRIS PETERS CO., PHOTO-LITHO., WASHINGTON, D. C.

UNITED STATES PATENT OFFICE.

THOMAS CUNNINGHAM, OF WENHAM, MASSACHUSETTS.

CONDUIT FOR ELECTRIC WIRES OR CABLES.

SPECIFICATION forming part of Letters Patent No. 689,541, dated December 24, 1901.

Application filed December 26, 1899. Serial No. 741,548. (No model.)

*To all whom it may concern:*

Be it known that I, THOMAS CUNNINGHAM, a citizen of the United States, and a resident of Wenham, county of Essex, and State of Massachusetts, have invented a new and useful Improvement in Conduits for Electric Wires or Cables, of which the following is a full, clear, and exact description, reference being had to the accompanying drawings, forming a part of this specification, in explaining its nature.

Figure 1:
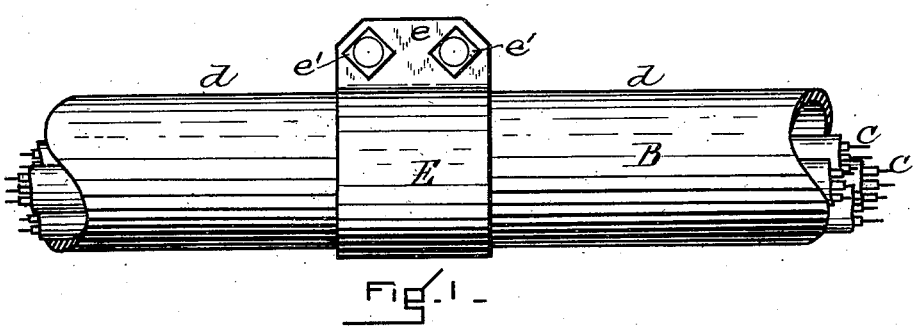
Figure 2:
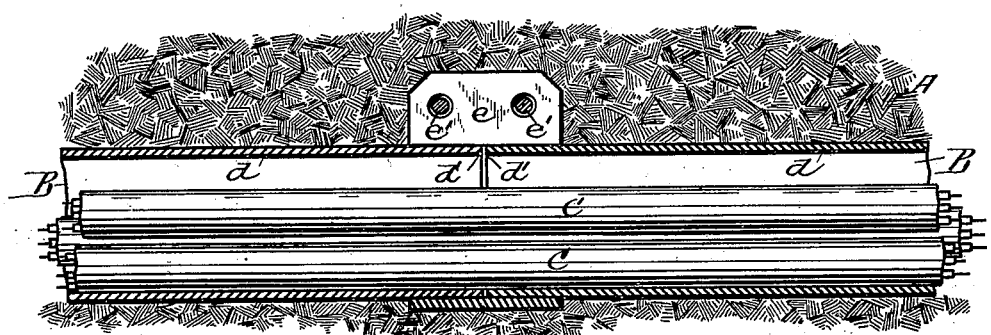
Figure 4:
Figure 5:
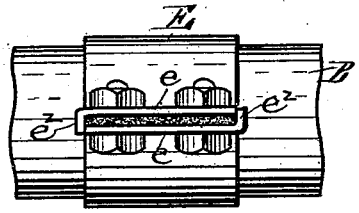
Figure 3:
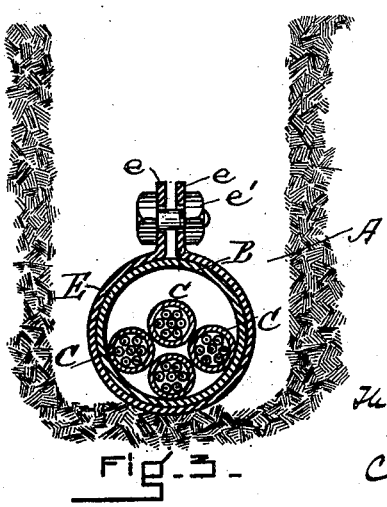

Referring to the drawings, Figure 1 is a view in elevation of my improvement. Fig. 2 is a view in vertical section thereof when in a trench. Fig. 3 is a view in cross vertical section, taken in the trench and through the uniting-band. Figs. 4 and 5 illustrate a slight modification to which reference is hereinafter made.

A represents a narrow trench at the bottom of which the conduit is located. The conduit comprises the cables or wires C and the surrounding metallic envelop B, which consists of metallic tubes $d$, preferably of the same diameter throughout, the ends $d'$ of which abut and are held together and in line by a band E, the ends $e$ of which project upward on the upper side of the conduit and are drawn together by the bolts and nuts $e'$ which extend through them. There is thus provided a means for laying electric cables and electric wires underground in a very easy, cheap, and efficient manner. The trench in which it is laid can be cheaply and quickly excavated and filled, no lateral excavation being necessary for the joining of the sections of the tubes. The joint requiring manipulation is above the tubes, and therefore always readily accessible. The ends of the tubes do not require to be finished in any way for the purpose of union, and old boiler-tubing, which before had been refuse, may be employed as well for the tubes as new stock. As there is no fitting at the joints, the conduit-casing may be very quickly laid in the trench and united.

If desired, each of the ears $e$ of the upwardly-extending sections of the band E may have a vertical section $e^2$ extending from one edge, so arranged as to close the ends of the cavity between the ears $e$, forming the sides of said cavity, and this will provide a boxing for the reception of tar, cement, or any other joint-closing material which may be used for sealing the portion of the joint between the two tubes not covered by the band.

It will be understood that in many instances the lengths of tubes may be connected by their contractible connecting-bands and the bands locked in their contracted position by the locking-bolts before the tubes are laid in the trench; but when so constructed it will still be desirable, although not essential, that the joints of the bands be over the tubes or uppermost.

Having thus fully described my invention, I claim and desire to secure by Letters Patent of the United States—

1. The electric conduit herein described, the same consisting of lengths of worn-out boiler-tubing having their ends squared and of uniform diameter with the remainder of the tubing, which ends are abutted and are combined together by wide cylindrical clamps of uniform diameter throughout and of a size to receive, surround and continuously bear against the surfaces of the abutted ends of the tubing which they inclose, all as and for the purposes set forth.

2. In a conduit of the character specified the combination of the tubular sections B, the ends of which abut, the enveloping bands E to partially surround said tubes where they abut and shaped to provide an inclosure for a joint-closing material over the portion of the joint not covered by them, and joint-closing material contained in said chambers or cavities.

3. The band E, having the ears $e$ and the end extensions $e^2$, as and for the purposes set forth.

THOMAS CUNNINGHAM.

Witnesses:
F. F. RAYMOND, 2d;
J. M. DOLAN.